INVENTOR
ROGER F. WERNLUND
BY Raphael Semmes
ATTORNEY

March 18, 1969 R. F. WERNLUND 3,434,150

APPARATUS AND METHODS FOR SILENTLY SURVEYING AUTOMOBILE RADIOS

Filed April 10, 1967 Sheet 2 of 2

INVENTOR

ROGER F. WERNLUND

BY Raphael Semmes

ATTORNEY

United States Patent Office 3,434,150

Patented Mar. 18, 1969

3,434,150

APPARATUS AND METHODS FOR SILENTLY SURVEYING AUTOMOBILE RADIOS

Roger F. Wernlund, Lake Worth, Fla., assignor to Franklin Gno Corporation, West Palm Beach, Fla., a corporation of Florida Filed Apr. 10, 1967, Ser. No. 629,632

U.S. Cl. 346—1 15 Claims

Int. Cl. G01d 9/00

ABSTRACT OF THE DISCLOSURE

Automobile radios are surveyed to determine station choice by monitoring emissions from local oscillators. Monitoring equipment includes antennae positioned adjacent to a roadway and a plurality of receivers having narrow band channels which analyze signals within the local oscillator spectrum. In one embodiment a channel output is registered only when coincident with the output of a separate car detector. Register data are periodically printed. Signal-to-noise ratio is greatly improved by a differential antenna arrangement and by other techniques.

This invention relates to apparatus and methods for silently surveying automobile radios to determine station choice and is more particularly concerned with detection of the emissions from the receiver local oscillators and with the enhancement of signal-to-noise ratio.

Radio networks and individual radio stations are intensely interested in the size of the listening audience throughout the broadcast day. Such information is of vital concern to the sponsors of radio programs and to their advertising agencies. Various schemes have heretofore been proposed for surveying radio receivers to ascertain the listener's choice of station. For example, monitoring equipment has been installed in the home to provide a log of station choice. Receivers have also been interrogated remotely, over telephone lines. Such schemes require individual installations, are expensive and are limited in terms of the survey sample.

It has also been proposed to survey home entertainment radio receivers by the use of mobile equipment for sensing local oscillator emissions. However, the accuracy of surveys obtained by this method is poor. The IF of a standard home broadcast receiver may be either 455 kHz. or 262 kHz., so that the local oscillator frequencies of two receivers tuned to the same station may differ greatly. In heavily populated areas the emissions of one local oscillator are masked by the emissions of many others. Shielding, in the form of building skeletons or other metal structures, reduces the level of the radiated local oscillator energy, which is inherently low for transistor radios and which may vary greatly for different stations and different receivers. A high level of man-made and atmospheric interference introduces further errors into the results of such surveys.

It is accordingly a principal object of the present invention to provide improved apparatus and methods for surveying radio audiences to determine station choice and audience size.

Another object of the invention is to provide apparatus and methods of the foregoing type which permit accurate measurement of the number of operating radio receivers tuned to surveyed stations at any given time.

A more specific object of the invention is to provide apparatus and methods for silently interrogating automobile radios.

Another object of the invention is to provide apparatus and methods of the foregoing type which are substantially insensitive to the speed of the monitored vehicle relative to the monitoring equipment.

Still another object of the invention is to provide apparatus and methods of the foregoing type in which readings are registered only upon coincidence with the output of a separate device responsive to the presence of the vehicle.

A further object of the invention is to provide apparatus and methods for greatly improving the signal-to-noise ratio, in order to permit reliable detection of weak local oscillator emissions even in the presence of strong interference or noise.

A still further object of the invention is to provide, more generally, apparatus and methods for detecting weak locally generated radio frequency signals in the presence of strong distantly generated radio frequency interference, which may be at the same frequency and from the same direction.

Briefly stated, a system of the invention comprises antennae which are located adjacent to a roadway and which establish a cone of sensitivity intersecting the roadway. The position and interconnection of the antennae are chosen to cancel strong distantly generated interference or noise and to enhance the level of the desired station-dependent signals relative to the noise. The signals are applied to receivers tuned to frequencies associated with different radio stations and are analyzed by a plurality of narrow band channels, the outputs of which are dependent upon the frequency of the signals. Channel outputs are registered only when coincident with the output of a separate car detector. Periodically the registered data are printed.

The foregoing and other objects, advantages, and features of the invention will become more readily apparent upon consideration of the following detailed description of the invention taken in conjunction with the accompanying drawings, which illustrate preferred and exemplary embodiments, and wherein.

In accordance with the invention, the station to which an operating car radio is tuned is determined by detecting the radio frequency emissions from the local oscillator of the superheterodyne radio. This signal, at the base of the automobile receiving antenna, has been found to be several orders of magnitude larger than the noise generated in the input circuit of a good radio receiver and hence capable of measurement. For transistor radio sets the range of signal strength at the antenna is from 50 to 110 microvolts, while for vacuum tube radios the range is from 10 to 60 millivolts.

Figure 1:
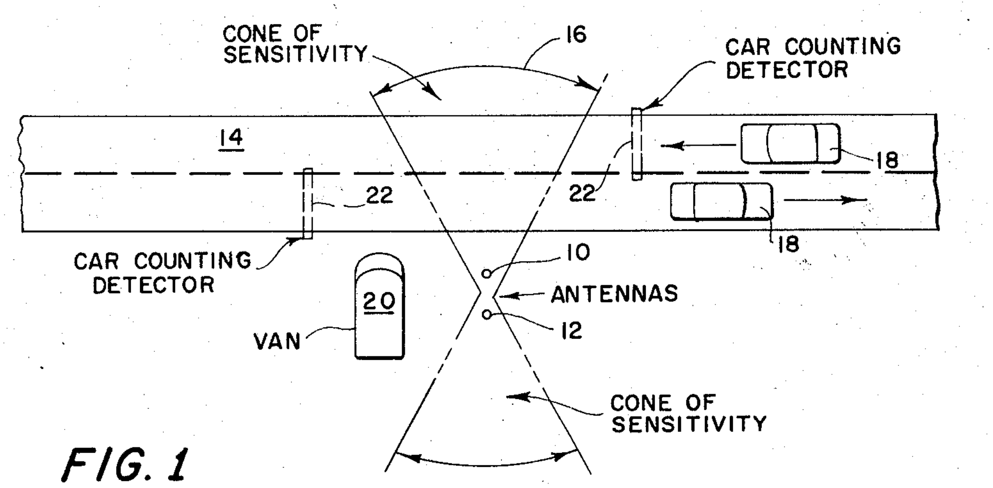
FIGURE 1 is a diagrammatic plan view illustrating the deployment of monitoring apparatus of the invention adjacent to a roadway.

Referring to the drawings, FIGURE 1 illustrates a typical environment of the invention. The monitoring apparatus comprises antennae 10 and 12, which form an array positioned adjacent to the roadway 14 and having a cone of sensitivity 16 (provided by the directivity pattern) which intersects the roadway so as to provide a region through which vehicles 18 may pass and be detected. The monitoring apparatus may be transported to an appropriate site by van 20 and the antennae 10 and 12 and car counting detectors 22 may then be deployed. The antennae 10 and 12 may be identical vertical whip antennae (e.g., one meter long) positioned above the ground at the same height and provided with ground planes. The car detectors will be described hereinafter.

The roadway illustrated is a conventional two-lane highway or street, and only half of the directivity pattern of the antenna is utilized. For such installations the other half of the pattern may be effectively suppressed by suitable shielding, as is well known. Alternatively, the other half may be utilized by locating the antennae on the median strip of a divided highway, so that each half of the pattern intersects one side of the highway. As a further modification, the antennae may be located on a shoulder of a superhighway and a single cone of sensitivity may intersect and perform the monitoring functions for all of the lanes.

The intersection of the cone of sensitivity and the roadway defines a triangular shaped area of predetermined size and shape. By counting the number of cars which pass through this area an exact measurement of the total size of the surveyed population can be obtained. Visual observation may be utilized to determine the number of passing cars having a radio antenna and the number of occupants in each car. Consequently, the total number of passing cars, the total number having auto radios, and the average number of people in each car will be known. Once these statistics have been determined at a given site and for different times it is possible to infer the size of the radio audience quite closely from the data recorded by the invention, as will be described hereinafter, without further visual observation of the passing cars.

Although the concept of determining listener preference by monitoring auto radios has many advantages in comparison to prior radio survey concepts, the realization of these advantages in practice has required the solution to several problems. The signals occur briefly, with random time spacing, and may overlap in time. Signal amplitude varies over a wide range due to factors such as variation in power of each local oscillator, variation in coupling of local oscillator signal to auto antenna, lane of travel and position of auto on the roadway, position and orientation of auto radio antenna, and variable reflections from other autos on the roadway. Two radios, both tuned to the same station may generate close but not the same local oscillator frequencies. Moreover, two stations to be monitored may be spaced by as little as 10 kHz.

Since it is not practical to measure the signal directly at the auto antenna, the monitoring equipment must be spaced from the signal source, where the signal is degraded and the effects of atmospheric and man-made noise or interference are quite significant. Particularly troublesome is the interference from powerful radio stations, which, although far from the monitoring apparatus, produce strong signals at or near the frequencies of the monitored local oscillators. Experiments have confirmed that, in the absence of enhancement of the signal relative to the noise, the signal-to-noise ratio outdoors is extremely poor and deteriorates rapidly as the distance from the signal source is increased. Moreover, the noise is very random, with high peaks, making it almost impossible to separate the desired signal from the unwanted noise.

The signal-to-noise ratio can be improved by the use of RF shields around the antenna, which reduce the sensitivity of the antenna to noise arriving from certain directions, and by refinements in antenna design. It has been found, for example, that a whip antenna in the near field of the signal source has a better signal-to-noise ratio than a loop antenna by a factor of twelve. Moreover, the whole system may be shielded by placing the monitoring apparatus in a tunnel or under an overpass.

Figure 4:
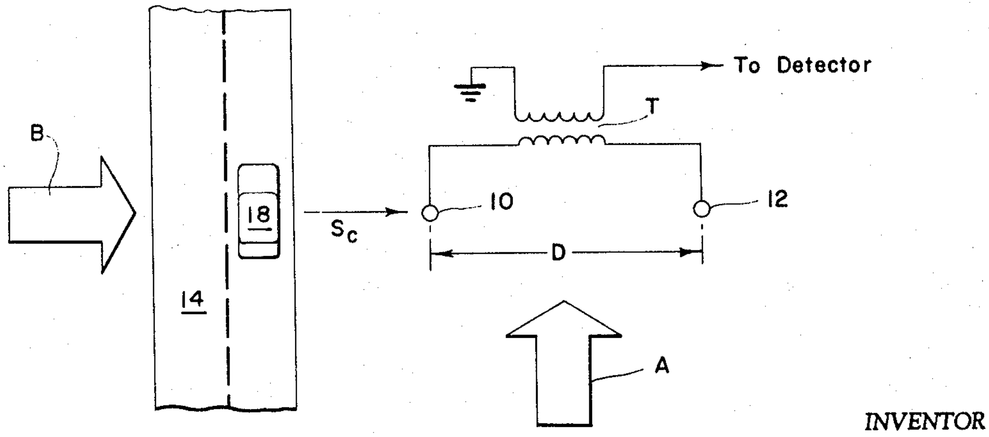
FIGURE 4 is a plan view, somewhat diagrammatic, illustrating a technique for improving the signal-to-noise ratio in order to enhance weak locally generated signals relative to strong distantly generated signals.

Very substantial improvement of the signal-to-noise ratio is achieved in accordance with an RF noise cancelling concept of the invention. Referring to FIGURE 4, the two antennae 10 and 12 are spaced apart a distance D which is a fraction of the wavelength of the signals to be received (preferably a very small fraction of a wavelength) and are connected to the input of a radio receiver or detector in phase opposition, as by a coupling transformer T in the form shown.

Because of its directivity pattern, the antenna system has poor sensitivity for interference arriving along a line perpendicular to a line connecting the antennae, as for example, interference from the direction of arrow A in FIGURE 4. Furthermore, since the antennae are spaced closely enough to insure equal reception, such interference is cancelled, because equal amplitude, opposite phase potentials are produced at the input to the detector. Interference arriving along a line joining the antennae, such as indicated by arrow B, and originating far from the antennae is also cancelled, as can be seen from the following analysis.

Assuming, for simplicity, that an antenna transmitting an interfering signal and the receiving antennae 10 and 12 are all short length, straight dipoles, the ratio of the power $P_R$ received at each receiving antenna to the power $P_T$ transmitted is given by the following relationship:

$$\frac{P_R}{P_T}=\left(\frac{0.119}{n}\right)^2$$

where $n$ is the number of wavelengths between the transmitting antenna and the receiving antenna. It is apparent that if the spacing between the two receiving antennae is a fraction of a wavelength of the interference, and if the distance between the transmitting antenna and each of the receiving antennae 10 and 12 is many wavelengths, the power received at each of the antennae 10 and 12 will be substantially the same and the interference will substantially cancel. The very slight phase shift between the voltages produced at the antennae 10 and 12 will not significantly detract from the cancellation.

Interference can arrive from any direction. Within a finite bandwidth, the noise in a detector circuit will be the vector sum of the individual components arriving from various sources and directions. Therefore, the degree of noise reduction provided by the differential antenna will be intermediate to the values obtained from the two examples given above.

The antennae 10 and 12 are located close to the source of desired signals, such as the car radio, in the near field of the signal emissions, and are positioned so that the desired signals arrive substantially along a line connecting the antennae. As will be seen from the following analysis, although there is some loss of desired signals received by the two antennae, the loss is small compared to the reduction of interference. Hence, the net effect is an increase in signal-to-noise ratio.

Again, assuming that the transmitting and receiving antennae are short dipoles, the signal transfer in the near field of the signal $S_C$ is given by the following relationship:

$$E_R=\frac{I_o h h_r}{4\pi\omega\epsilon R^3}$$

where $E_R$ is the voltage generated at the receiving antenna,
$I_o$ is the current in the transmitting antenna
$h$ is the height of the transmitting antenna
$h_r$ is the height of the receiving antenna
$\omega$ is $2\pi$ times the frequency of the signal $$\epsilon=\frac{1}{36\pi}\times10^{-9}$$

R is the horizontal distance between transmitting and receiving antennae.

Assuming that the receiving antennae are both the same height, it will be observed that the signal transfer varies inversely as the cube of the distance between the transmitting and the receiving antennae. Because of the proximity of the receiving antennae to the source and the rapid decrease of signal strength with increasing distance from the signal source, the distance D between the receiving antennae signifcantly reduces the voltage generated at antenna 12 relative to the voltage generated at antenna 10. There is thus a substantial amplitude difference between the signal voltages applied to the detector. Because the distance D is a very small fraction of the signal wavelength, the phase difference is insignificant. The following table gives the ratio $E_{c2}/E_{c1}$ of the signals from the antennae 12 and 10 (connected differentially) for various spacings $R_{c1}$ between the signal source and the nearest antenna and for various spacings D between the antennae 10 and 12.

| $R_{c1}$ (feet) | $E_{c2}/E_{c1}$, D=4 ft. | $E_{c2}/E_{c1}$, D=8 ft. | $E_{c2}/E_{c1}$, D=16 ft. |
|---|---|---|---|
| 2 | 0.0370 | 0.00800 | 0.00137 |
| 5 | 0.171 | 0.0569 | 0.0135 |
| 10 | 0.364 | 0.171 | 0.0569 |
| 20 | 0.579 | 0.364 | 0.171 |
| 40 | 0.751 | 0.579 | 0.364 |
| 80 | 0.864 | 0.751 | 0.579 |

Typically, the wavelength of the signal is 300 meters, so that for $D=8$ ft., D is 0.00812 wavelength.

The following table gives the minimum improvement in signal-to-noise ratio employing a differential antenna with the same spacings in the previous table.

| $R_{c1}$ (feet) | D=4 ft. | D=8 ft. | D=16 ft. |
|---|---|---|---|
| 2 | 241 | 124 | 62 |
| 5 | 207 | 118 | 61 |
| 10 | 159 | 104 | 59 |
| 20 | 105 | 79 | 52 |
| 40 | 62 | 53 | 40 |
| 80 | 34 | 31 | 26 |

It is apparent that the improvement is greater for smaller antenna spacings D and smaller distances $R_{c1}$. This represents the *minimum* amount of signal-to-noise ratio improvement that can be obtained by the differential antenna concept. In practice, substantially greater improvements have been obtained than these tabulated factors indicate.

In ratio surveying apparatus for home receivers it has been proposed to use a panoramic monitoring receiver, but this technique has been found to be unsuitable for surveying automobile radios. Although automobile radios have the advantage of a standard IF frequency, 262.5 kHz., the local oscillator frequencies for the various stations which it is desired to monitor will vary greatly (between 812.5 and 1862.5 kHz.). Since the signal source is within the cone of sensitivity for a relatively short period of time and since the panoramic receiver must sweep through the full range of possible local oscillator frequencies while each vehicle is within the cone of sensitivity, the length of time that the receiver is tuned to the frequency of a particular local oscillator is very small. The total power received from a passing automobile is reduced by the duty cycle, but the noise is continuously received. It is necessary to integrate the signal so as to measure the average value of the signal and compare it with the average value of the noise at any instant. This requires a time constant longer than can be used with a sweeping type detector. The present invention employs multiple fixed-frequency narrow band detectors.

Figure 2:
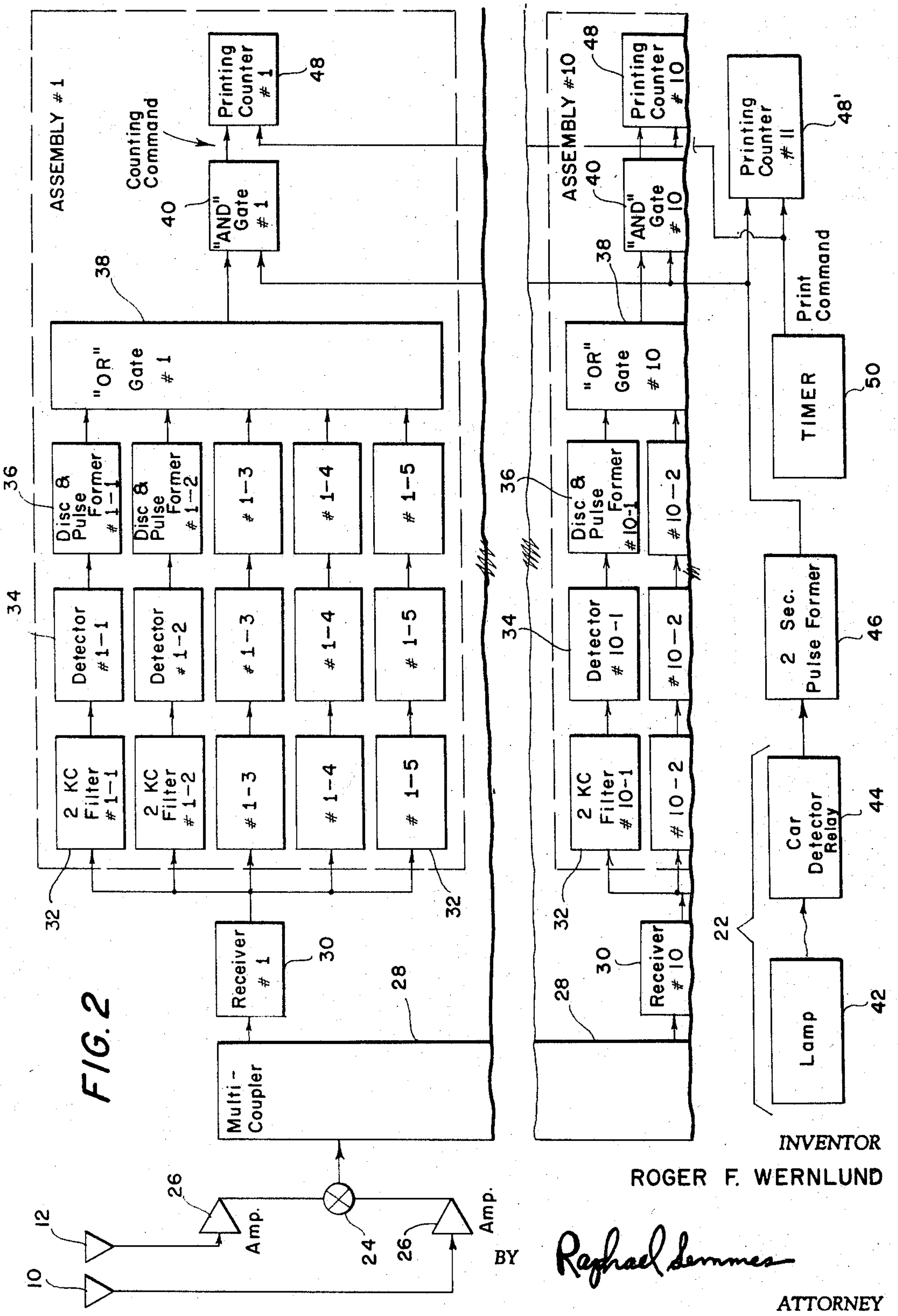
FIGURE 2 is a block diagram of a surveying system of the invention.

Referring to FIGURE 2, the outputs from the antennae 10 and 12 are fed to a difference detector 24, which may be an active or a passive component for combining the outputs in phase opposition and for producing a resultant output in accordance with the difference of the outputs from the antennae, as set forth above. Amplifiers 26 may be connected between the antennae and the difference detector to compensate for any difference in gain, and the signal paths from the antennae 10 and 12 may be adjusted to have substantially identical amplitude and phase characteristics. The resultant output from the difference detector is applied to a conventional multi-coupler 28 (a well known isolating network), which supplies identical inputs to a series of radio receivers 30, there being ten receivers in the illustrative form. Each receiver, containing RF, converter and IF stages, forms the input to an assembly for detecting car radios tuned to one particular station and is tuned to receive the corresponding local oscillator frequency from the auto radios. The bandwidth of each receiver must be great enough (e.g., ±5 kHz.) to accommodate the usual variation of local oscillator frequency when different receivers are tuned to the same station.

Each assembly comprises a plurality of channels having, in sequence, a bandpass filter 32, a detector 34, and an amplitude discriminator and pulse former 36, there being five 2 kHz. channels for each assembly in the illustrative form. The center frequencies and bandwidth of the filters are selected so that the filters cover successive portions of the total IF bandwidth of the associated receiver 30. The filters separate signals which lie within their pass bands. The detectors reproduce the envelope of the IF signals passed by the filters. Detected signals above an amplitude threshold are passed by the discriminator and formed into rectangular pulses by the pulse formers. Thus, for each signal passed by one of the receivers 30, there will be an output pulse from one of the pulse formers 36.

The outputs from the pulse formers 36 are applied to an OR gate 38, which produces an output when any one of its inputs is stimulated. Since only one narrow-band channel at a time will pass a signal of sufficient strength to produce an output pulse for actuating the OR gate, the effects of noise are greatly reduced. The output from the OR gate is applied as an input to an AND gate 40. However, the AND gates will only produce an output when there are concurrent inputs from an OR gate 38 and from a car detector 22, which is independent of the electromagnetic emission detectors, thus further reducing errors due to interference. The car detector may be a photoelectric type, for example, or any other conventional type. In the form shown a lamp 42 produces a light beam which is interrupted by the vehicles which pass through the cone of sensitivity to produce an output from the photocell-actuated car detector relay 44, the output being stretched by a pulse former 46 for application to the AND gates of the assemblies. The pulse former 46 ensures concurrent inputs to the AND gates even if the car detector is located before the cone of sensitivity.

The output of each AND gate 40 constitutes a counting command to a corresponding printing counter 48, which also receives an input from a timer 50. Each printing counter contains a register which constantly accumulates data from the corresponding AND gate, the data being printed periodically upon command from the timer 50. A further printing counter, 48', counts the number of impulses from the car detector relay 44 and prints the total number of cars passed in a given time interval. Thus, the total sample size is recorded as well as the listening habits of the public. The printers 48 may record the date and the time of day and the number in the counter, and the counters may then be automatically reset to zero.

Figure 3:
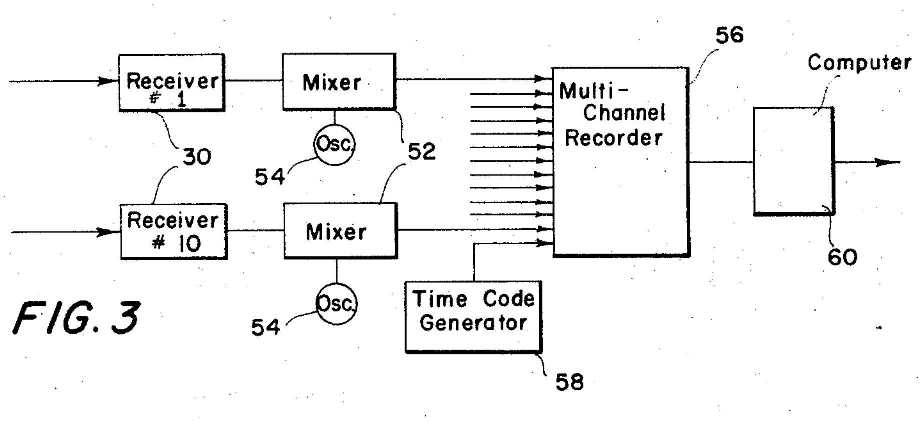
FIGURE 3 is a partial block diagram of a modification.

In the alternative embodiment of FIGURE 3, the IF filters, detectors, and printing counters are omitted. Each channel is provided with a second mixing stage 52 having a local oscillator 54 to beat the IF down to a lower value. The outputs from the mixers are applied to corresponding inputs of a multi-channel recorder 56, such as an Ampex FR–1300 portable instrumentation recorder, which provides fourteen tracks with 300 kHz. frequency for direct IF pre-detection recording. One channel of the recorder receives coded signals from a time code generator 58, such as the Astrodata Model 5100 time code generator. Upon completion of a full day's recording, the tape is fed into a conventional computer 60 equipped with multi-channel narrow bandwidth detectors, for automatic analysis of the data and print-out of the results. With proper computer programming a full day's results can be printed, including the programming of each station for the time period involved.

The apparatus and methods of the invention readily produce accurate surveys of station preference. The sample size is well defined. The monitoring apparatus has substantially constant sensitivity for all stations within the broadcast band. Errors due to operation of receivers at different intermediate frequencies, to the masking of one local oscillator emission by another, to variations in signal strength or shielding, to interference, or to the speed of the vehicles are largely eliminated.

Although optimum results are achieved with the differential antenna concept when the distance D is a small fraction of the wavelength of the signal, preferably less than one fourth wavelength, beneficial results may still be obtained when D is up to one half wavelength.

The invention claimed is:

1. A method of surveying radio station preference of a radio audience, which comprises, monitoring the local oscillator emissions of automobile radios at a region along a roadway to provide signals characteristic of the stations to which the radios are tuned, registering the number of signals for each of the respective stations during different time periods, producing an impulse for each automobile passing through said region, and registering the number of impulses during such time periods.

2. The method of claim 1, further comprising periodically recording the signals and impulses registered.

3. A system for monitoring radios in automobiles traveling along a roadway to determine radio station preference, comprising means having a sensitivity pattern intersecting said roadway for producing station-dependent signals derived from operation of automobile radios in said pattern, a plurality of receivers each arranged to pass one of said signals corresponding to a particular radio station to which said radios may be tuned, and means for registering the signals in the outputs of said receivers.

4. The system of claim 3, each receiver having a plurality of parallel narrow band channels covering successive portions of the band width of the receiver, said channels being connected between the outputs of said receivers and said registering means.

5. Th system of claim 4, there being an OR gate for each receiver, the associated channels having outputs connected to inputs of said OR gate and said OR gate having an output connected to said registering means.

6. The system of claim 5, there being an AND gate for each receiver and having a pair of inputs, the output of the associated OR gate being connected to one input of the AND gate, said system further comprising automobile detecting means having an output at which an impulse is produced for each automobile passing through said pattern, the output of the automobile detecting means being connected to the other input of each AND gate, said AND gates having outputs connected to said registering means.

7. The system of claim 4, each of said channels comprising, in sequence, a bandpass filter, a detector, an amplitude discriminator and a pulse former.

8. The system of claim 3, further comprising automobile detecting means for producing an output impulse for each automobile passing through said pattern, and means controlling said registering means to register the signal in the output of each receiver only when that signal is coincident with an output impulse from said automobile detecting means.

9. The system of claim 3, further comprising timer means for causing said registering means to produce an output reading periodically.

10. The system of claim 3, said registering means being a multi-channel recorder having channel inputs connected to said receiver outputs, respectively, time-code generator means, said recorder having an input connected to the output of said time-code generator means for recording a time code, and computer means connected to the output of said recorder for producing a readout of the number of signals recorded in each channel during different time periods.

11. The system of claim 3, the first-mentioned means comprising a pair of antennae located in the near field of said signals and successively spaced from said roadway and from each other, the distance between said antennae being a fraction of the wavelength of said signals, said antennae being connected differentially in order substantially to cancel interference received thereby with substantially the same amplitude and substantially the same phase.

12. The system of claim 3, said registering means being a series of printing counters.

13. Apparatus for monitoring radios of automobiles travelling along a roadway to determine radio station preference, said radios having local oscillators which emit oscillations characteristic of the stations to which the radios are tuned, said apparatus comprising means having a sensitivity pattern intersecting said roadway for producing signals in response to said oscillations received from automobiles in said pattern, additional means for detecting all automobiles passing through said pattern and for producing corresponding outputs, means for analyzing said signals and producing outputs representative of the corresponding radio stations, and means for recording the last-mentioned outputs only upon coincidence with corresponding outputs from said automobile detecting means.

14. The apparatus of claim 13, said signal producing means comprising a pair of antennae spaced successively farther away from said roadway by distances which are a fraction of the wavelength of the signals, and means connecting said antennae differentially to produce cancellation of interference received by said antennae with substantially equal amplitude and substantially the same phase.

15. Apparatus for monitoring heterodyne-type radios of automobiles travelling along a roadway to determine radio station preference, comprising a pair of antennae spaced successively from said roadway and separated from each other by a distance which is a fraction of the wavelength of the local oscillations of said radios, said antennae being located in the near field of said oscillations and one of said antennae receiving signals of substantially greater strength than the other from said oscillators, and means connecting said antennae to produce an output differentially for cancelling interference received by said antennae with substantially equal amplitude and substantially the same phase.

References Cited

UNITED STATES PATENTS

| | | | |
|---|---|---|---|
| 1,947,247 | 2/1934 | Bruce | 343—853 X |
| 2,896,070 | 7/1959 | Fremont et al. | 325—311 X |
| 3,299,355 | 1/1967 | Jenks et al. | 325—31 |

RICHARD B. WILKINSON, *Primary Examiner.*

JOSEPH W. HARTARY, *Assistant Examiner.*

U.S. Cl. X.R.

235—92; 325—31; 343—853; 346—37